April 27, 1926.

H. J. BARNHART

VEHICLE STRUCTURE

Filed May 12, 1921  2 Sheets-Sheet 1

1,582,569

Harry J. Barnhart INVENTOR.

BY

Edwin P. Corbett ATTORNEY.

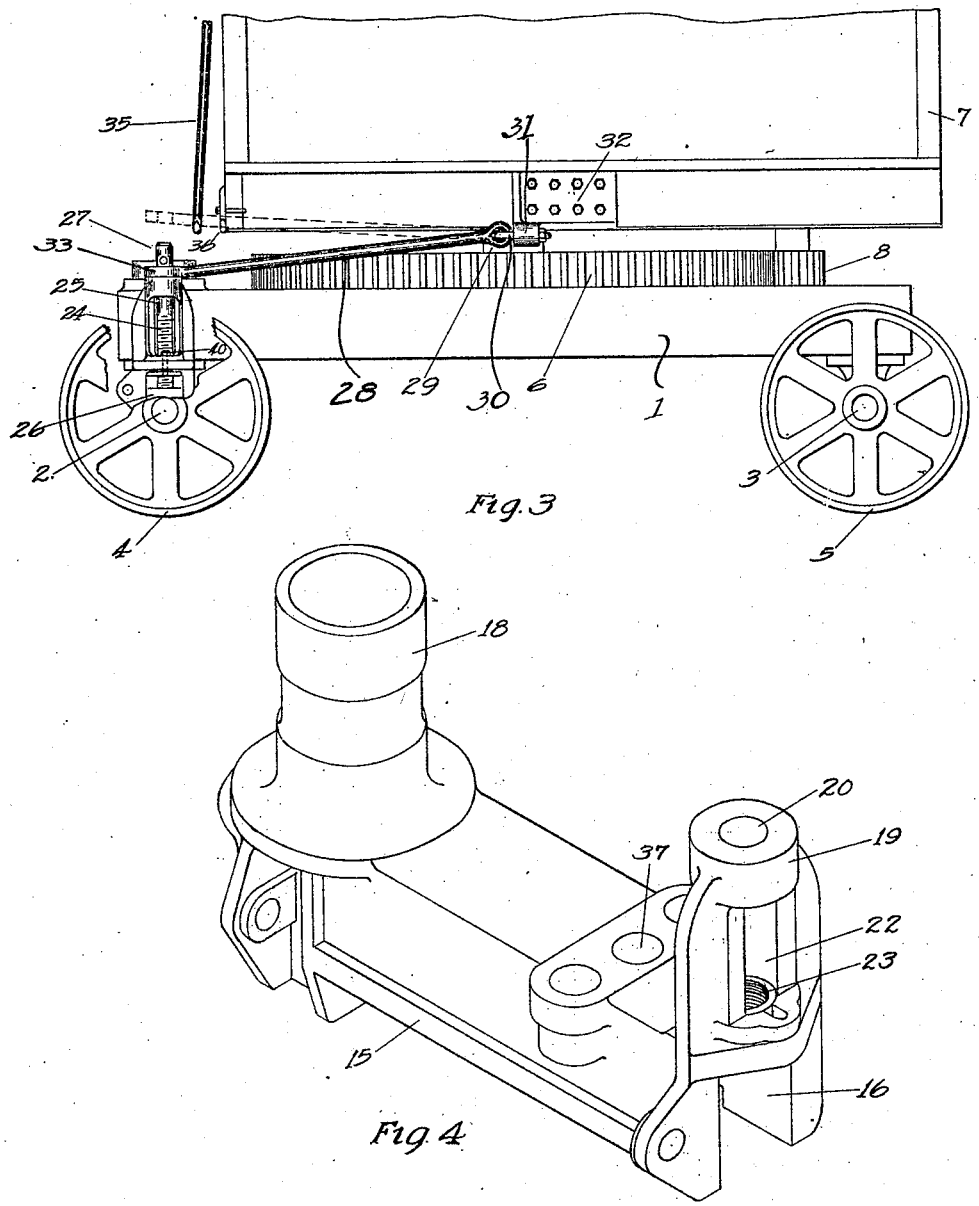

Patented Apr. 27, 1926.

1,582,569

UNITED STATES PATENT OFFICE.

HARRY J. BARNHART, OF MARION, OHIO, ASSIGNOR TO THE OSGOOD COMPANY, OF MARION, OHIO, A CORPORATION OF OHIO.

VEHICLE STRUCTURE.

Application filed May 12, 1921. Serial No. 468,851.

*To all whom it may concern:*

Be it known that I, HARRY J. BARNHART, a citizen of the United States of America, residing at Marion, in the county of Marion and State of Ohio, have invented certain new and useful Improvements in Vehicle Structures, of which the following is a specification.

My invention relates to vehicle structure and is particularly directed to the provision of a novel and simple apparatus designed to vary or maintain the line of travel of a vehicle. It aims to provide a mechanism that has a minimum number of parts and that can be placed in operative position or removed therefrom with great facility.

It is old to utilize the swinging of the superstructure to effect steering of a vehicle and it is old to steer manually. But I have provided a device that accomplishes this and yet is free from undesirable strains, is free from undue complication and may be placed in operation by the operator without descending from the vehicle.

My invention resides primarily in the provision of a steering bar that is connected to the superstructure of the vehicle and to a relatively heavy element which forms a continuation of the pivot post and which embraces the axle so that movement of such element about the pivot post axis will result in movement of the axle to effect steering.

This element to which the steering bar is connected is of general U-form, the pivot post forming one leg and the other leg being formed by the sleeve which contains one jack-screw. It is of such form that it is possible to connect the pull and thrust bar at a point between the truck and one wheel so that a straight bar can be used and at such a height that the pull or thrust bar will be practically level when in operative position.

I have also provided a means whereby the swiveled axle of the vehicle may be locked in any one of several positions whereby it will be possible to maintain a straight line of travel for short distances or a curved line of travel when desired.

My device lends itself with great readiness to the revolving types of power shovels embodying leveling jack screws which may serve as a means of connection between my pull and thrust bar and my axle embracing member. This jack screw is desirably extended up from my axle embracing member so as to form a receiving rod or pin for an apertured end of my pull and thrust bar. The result of this construction is that the operator of the power shovel may drop the pull and thrust bar into operative position without leaving his cab merely by using a hook-like rod.

The preferred embodiment of my invention involves other features of advantage and is shown in the accompanying drawings wherein similar characters of reference designate corresponding parts and wherein—

Fig. 3 is a side elevation showing the steering mechanism and jack structure in detail.

Fig. 4 is a perspective view of the center pivot steering element which embraces the axle.

Figure 1:
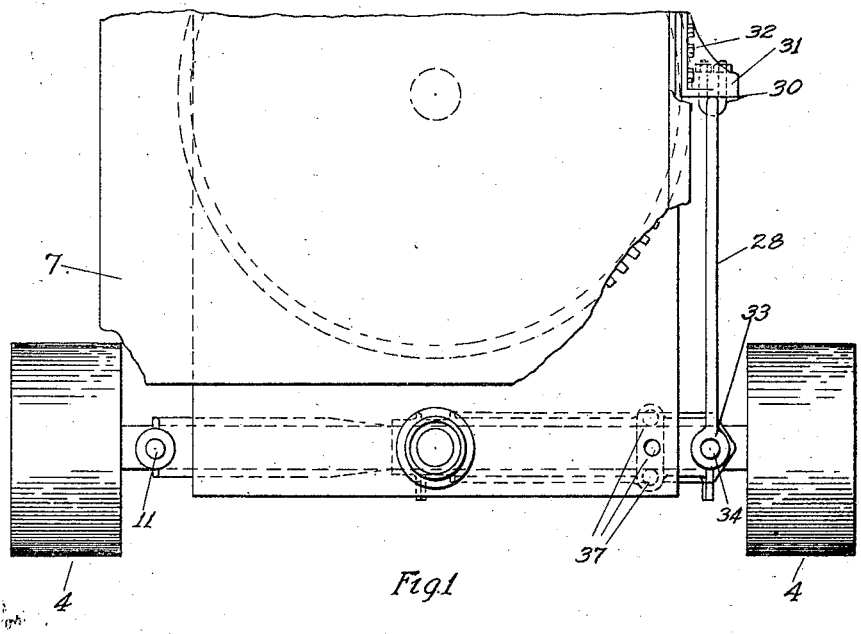
Fig. 1 is a sectional plan view showing the swiveled axle structure and the steering device applied thereto.
Figure 2:
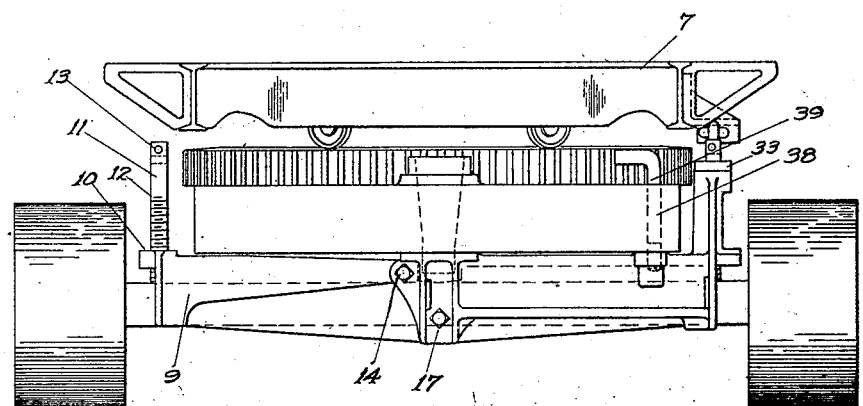
Fig. 2 is a front elevation of the structure shown in Figure 1.

In the drawings, I have not attempted to show the structure of my steam shovel in detail but have merely illustrated the superstructure thereof in a more or less diagrammatic way. The truck upon which this superstructure is mounted may be designated 1 and is shown to be carried by front and rear axles 2 and 3 and wheels 4 and 5. The truck carries a stationary gear 6 which is horizontally mounted upon the upper surface thereof. The superstructure may be generally designated 7 and is rotatable about this gear by means of a pinion 8, in a manner that will be readily understood since it is more or less common in the art.

The front axle 2 of my steam shovel structure is so mounted that substantially one-half thereof fits within a channeled member 9 whose outer end carries a threaded apertured portion 10. A jack screw 11 threaded as at 12 operates in this apertured portion 10, with its lower end bearing upon the axle 2. This jack screw 11 has an aperture 13 in its upper end through which a jack bar may be inserted for rotation of the jack screw 11. By rotating this screw 11, the channeled member 9 may be raised or lowered to raise or lower this corner of the truck and superstructure with relation to the axle.

The inner end of said channeled member 9 is pivoted as at 14 to a U-shaped axle-embracing member which is shown independently in Figure 4. This U-shaped axle embracing member is provided with a base 15 having a substantially U-shaped channel 16 in its lower end within which is designed to fit the other half of the axle 2, the channeled structure being preferably pivoted to the axle by means of the bolt 17.

This U-shaped member is preferably provided on its inner end with an upstanding post 18 that passes through the truck 1 and serves as a swivel post for the front axle structure. This upstanding post is preferably made integral with the channeled structure 15. At its outer end, this channeled structure 15 is provided with an upstanding sleeve-like member 19 having a bearing 20 for the jack screw. The intermediate portion of this sleeve-like member is cut away as at 22 and adjacent its lower end it is provided with a threaded bearing 23 within which cooperatively fit the threads 24 of the jack screw 25. This jack screw 25 bears at its lower end in a socket 26 carried by the axle 2 and is provided at its upper end with an aperture 27 through which a bar may be passed for rotation of the jack screw. The rotation of this jack screw will serve to compensate for the space between the axle and the base of the channel of the channeled member 15 under varying conditions.

An important aspect of my invention arises from the fact that I utilize the jack-pin 25 and the U-shaped member shown in Figure 4 to facilitate steering of the steam shovel structure which is accomplished by the provision of a straight thrust bar 28 having a loop 29 at its rear end, which loop is retained within the staple member 30. This staple member 30 extends into a lateral projection 31 of a bracket 32 which is bolted to the superstructure substantially opposite the axis of rotation of the swiveled superstructure 7. The opposite end of the pull or thrust bar 28 is enlarged as at 33 and apertured as at 34. This pull or thrust bar is straight, which is made possible by the location of the point of connection to the superstructure and to the jack screw and it is also substantially horizontal while in operative position. This gives a direct thrust requiring a minimum expenditure of energy and with no likelihood of bending the bar and avoids up and down movement of the end 33 which obviates the necessity of universal joints. Furthermore, the bar may be removed from the pin, as shown in Figure 3, by the operator in the superstructure who may use a type of rod with a hook on its end as indicated at 35. Thus, the bar may be readily lifted into dotted line position of Figure 3 or it may be lowered from this position so that the aperture 34 embraces the jack screw 25, the necessary alinement being readily attained by a rotation of the superstructure to any necessary degree. When the bar is out of operative position, as shown in dotted lines in Figure 3, it may be retained in such position by a hook-like support 36 carried upon the superstructure 7.

A means is provided for locking the center axle structure in any adjusted position. It preferably comprises a plurality of sockets 37 arranged upon an arc in the upper face of the base member 15. For cooperation with these sockets, I have provided an aperture 38 in the body of the truck which may be caused to align with either one of the sockets 37 by the adjustment of the swiveled axle. Adjustment may be readily attained through the pull and thrust bar 28. When this alinement is attained, the pin 39 may be dropped into the opening 38 and will pass downwardly into one of the aligning sockets 37, with the result that the axle will be rigidly locked to the truck body.

It will be seen from this that I have provided a pull and thrust bar for steering my steam shovel structure and that this steering mechanism is of extreme simplicity. It makes possible the obtaining of a direct thrust in a substantially horizontal plane. It eliminates all danger of interference of the thrust bar with the wheels and all danger of bending of this thrust bar. It further makes possible the ready placing of the thrust bar into operative position or the removal therefrom by the operator in the cab of my steam shovel structure and without the necessity of descent of such operator from the cab.

In addition, maintenance of the level of the corners of the truck is in no sense interfered with. On the contrary, the very means utilized for this purpose is further utilized to form an ideal means of connection between the thrust bar and the axle embracing member. The structure of the U-shaped member utilized affords ample rigidity and it is also well adapted to the provision of a novel form of locking device that I have provided in connection with my invention.

Having thus described my invention, what I claim is:

1. A truck, a swiveled axle for said truck, wheels on said swiveled axle, a swiveled superstructure, an axle embracing member, a thrust and pull bar and means for moving said thrust and pull bar so as to couple or uncouple said axle embracing member and superstructure, said means being adapted to hold said thrust and pull bar in its uncoupled position during the uncoupled period.

2. A truck, a swiveled axle for said truck, wheels on said axle, a swiveled superstructure, a pull and thrust bar connected to said superstructure and a jack screw for adjusting the axle with relation to superposed parts and for serving as a connection between said pull and thrust bar and said axle.

3. A truck, a swiveled axle for said truck, wheels on said axle, a swiveled superstructure, a pull and thrust bar connected to said superstructure, and a U-shaped member embracing the axle, one leg thereof forming the pivot for said axle, and the other leg thereof forming a part of a connection between said pull and thrust bar and said axle.

4. A truck, a swiveled axle structure for said truck, wheels on said axle structure, a swiveled superstructure, a removably applicable pull and thrust bar for connecting said axle structure to said swiveled superstructure, a plurality of sockets in said axle structure, and means cooperating with said truck for locking the axle structure directly to the body of the truck in different positions of adjustment.

5. A truck, a swiveled axle member for said truck, a jack screw for adjusting the axle with relation to said truck, and means operable through said jack screw for varying the position of said axle member to effect steering of the truck.

6. A truck comprising a base, an axle embracing member, a swiveled superstructure, means for adjusting said embracing member and a steering rod connecting said superstructure to said axle embracing member.

7. In a machine of the character described, a base, a swiveled axle for said base, wheels for said axle, a swiveled superstructure, means for adjusting the level of said base, and means connecting said superstructure and said leveling means for steering said wheels.

In testimony whereof I hereby affix my signature.

HARRY J. BARNHART.